United States Patent Office 3,514,980
Patented June 2, 1970

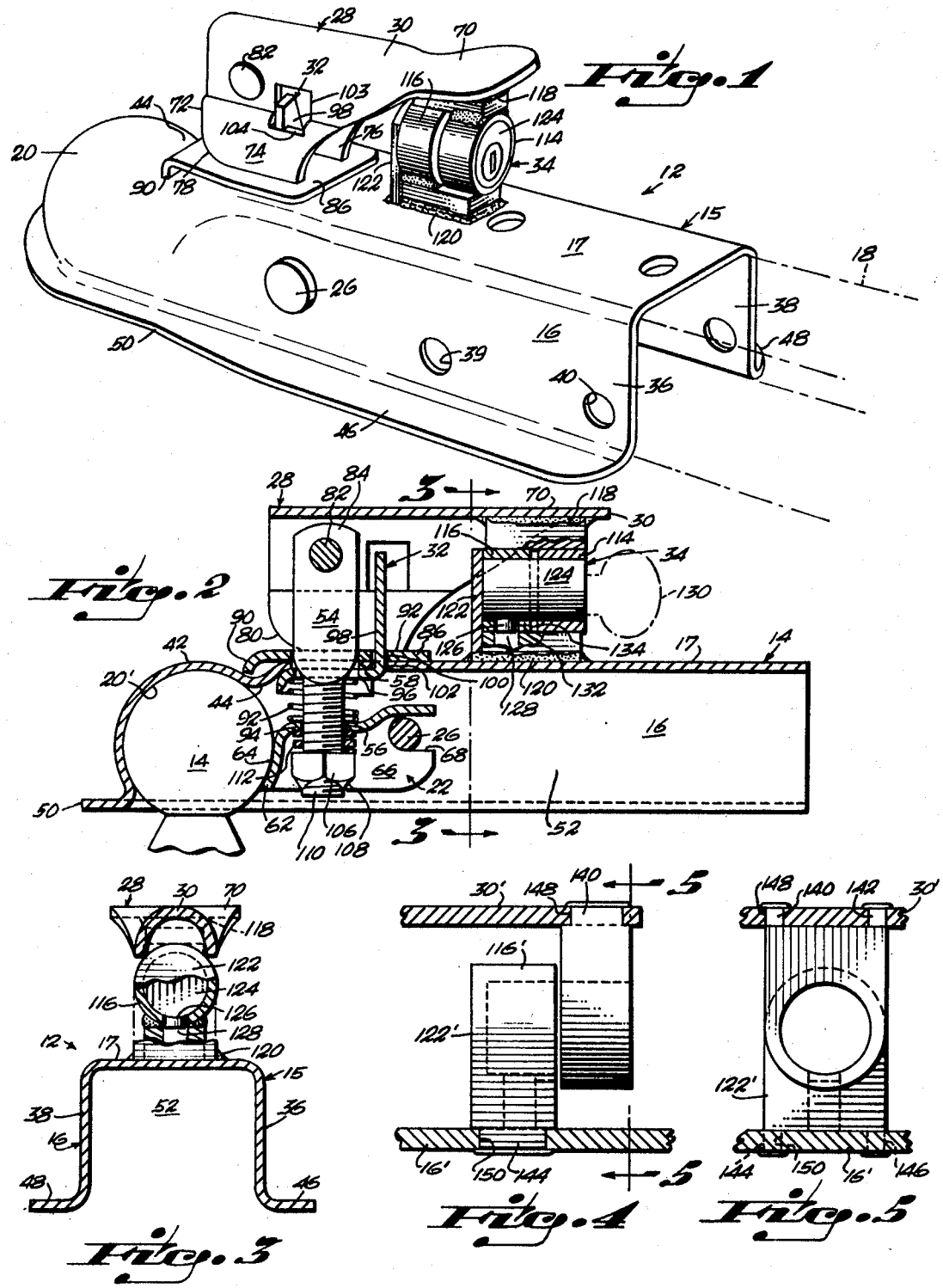

3,514,980
SAFETY LOCK FOR A TRAILER COUPLER
John B. Doyle, 330 Ponce de Leon Blvd.,
Coral Gables, Fla. 33134
Filed Sept. 20, 1968, Ser. No. 761,105
Int. Cl. E05b 65/12; B60d 1/12
U.S. Cl. 70—258         7 Claims

ABSTRACT OF THE DISCLOSURE

A lock assembly for a lever type trailer coupler composed of (a) a pair of ring members, one on the lever and one of the coupler housing, with the openings of the rings being similarly sized and arranged in coaxial relation when the lever is in the latched position, and (b) a cylindrical barrel lock in co-axial relation with the rings and extending into each of the openings to prevent the lever from being moved to the unlatched position except upon use of a key to remove the barrel lock from the opening; an appropriate backing plate is provided on one of said ring members to act as a stop when the barrel is being positioned within the rings.

---

The present invention pertains to a safety lock for a lever type trailer coupled which locks the lever of the coupler to its housing to keep a coupler in its normal coupled or latched position on a hitch attached to a car. The lock is provided so that, until it is removed a trailer on which the coupler is mounted cannot be unhitched from the ball of a conventional ball type hitch of a vehicle or, if the trailer is parked alone, it cannot be unhitched from a vehicle and towed away by a thief.

The conventional coupler and ball type hitch illustrated in the drawings are in widespread use on many different types of trailers, such as house trailers and hauling trailers of various types, especially boat trailers. A security problem exists, particularly with respect to boat trailers, because they are often left unattended for long periods of time when the boat is in use, as in fishing, or, when the boat is parked in a back yard and the car is used for a different purpose other than in towing the boat. It requires very little time to take an unattended boat trailer by backing a vehicle equipped with a ball hitch into position and dropping the coupler over the ball and latching it in place. As a result, many trailers particularly boat trailers, are stolen annually. The problem exists also with respect to boat trailers which are left latched to cars in parking areas adjacent to boat launching ramps and are unattended for hours while the owner is using the boat. Under such circumstances, it takes very little time to transfer the trailer from one car to another if the coupler is not locked to the ball hitch and, therefore, many boat trailers are stolen in this manner.

It is, therefore, a principal object of the instant invention to provide a safety lock for a trailer coupler which may be locked in a coupled position while engaged on a ball hitch so that it cannot be removed therefrom without the proper key or which may be locked in a coupled position while not in engagement with the ball of a hitch to prevent the coupler from being dropped on a ball hitch of a vehicle and stolen.

A further object of this invention is to provide a locking means for a trailer coupler which includes a pair of cooperating ring members having commonly sized openings to receive a barrel lock in spanning relation of the two ring members to lock them together when the coupler is connected to a hitch; the two rings are fixed respectively to the top of the coupler housing or body and to the coupler latch lever or operator and are in coaxial relation when the coupler is latched.

It is a general object of this invention to provide an improved locking means for a coupler to be used with a ball type hitch and which includes a pivot lever to operate a clamping means between a latched and an unlatched position to hold the ball of a trailer hitch in clamped relation, the said locking means comprising (a) a pair of rings, one on the housing of the coupler and one on the pivot lever which are adapted and arranged to be in coaxial relation when the coupler is in the latched position and (b) a barrel lock to be secured within the rings to hold them in said coaxial relation until removed by the use of a proper key, the said barrel lock including a spring biased radially projecting keeper pin and a pin socket in the ring to resist removal of the barrel lock until the keeper pin is withdrawn from the socket, whereupon the barrel lock may be removed axially from the rings to permit relative movement of the pivot lever to release the clamping means.

It is another object of this invention to provide an approved locking means for a coupler, especially for use on a boat trailer which is simple in construction, adapted to be installed on lever type couplers, which is inexpensive to manufacture and is adapted for use on either existing boat couplers or on newly manufactured coupler devices.

In accordance with these and other objects which will become apparent hereinafter, the instant invention will now be described with reference to the accompanying drawings in which:

FIG. 1 is a perspective view of a trailer coupler provided with the locking means of the instant invention;

FIG. 2 is a vertical view in cross section taken along the longitudinal center line of the coupler seen in FIG. 1 with the tongue of the trailer removed;

FIG. 3 is a view in cross section taken along the plane indicated by the line 3—3 of FIG. 2 and looking in the direction of the arrows;

FIG. 4 is a side elevation view of the lock means of an alternative embodiment; and FIG. 5 is a view taken on the plane indicated by the line 5—5 of FIG. 4 and looking in the direction of the arrows.

Referring to the drawings, wherein like reference characters designate like or corresponidng parts thoughout the different views, and referring particularly to FIG. 1, there is shown a coupler 12 which is adapted to be connected to a hitch 14 of the ball type mounted to a draw vehicle, such as an automobile, not shown. The coupler includes a housing 15 with a body portion 16 of channel form whereby the same is adapted to be mounted over the leading or forwardmost end of a trailer tongue 18, the said housing also including a ball type socket 20 at the forwardmost end. The coupler includes a jaw 22 movable into and out of ball-defining relation, as seen in FIG. 2, to captivate the ball of the hitch 14 in the socket. Means are provided comprising a pivot 26 for effecting pivotal movement of the jaw in a manner to be explained and, additionally, operator means 28 are provided for lifting the jaw relative to the socket-defining portion of the housing to captivate a ball 14 therein. The operator means 28 includes a lever 30 for a favorable mechanical advantage in effecting the hooked-up relation of the coupler to a hitch. Latch means 32 are provided to hold the jaw in a clamped position, and lock means 34 are provided to secure the jaw in the clamped position.

Referring more in detail to the various components of the trailer coupler, it is seen that the housing 14 includes a web 17 with downwardly extending flanges 36 and 38 which are sized to receive the tongue in nesting relation therein and to receive bolts for securing the engagement through the holes such as that indicated by the numerals 39 and 40. The ball type socket walls at the forward edge define an interior hollow 20' having a dome portion 42 with a depressed neck portion 44 intermediate the body portion 16 and the dome 42. Preferably, the flanges 36 and 38 of the body portion 16 are out-turned along their terminal ends as at 46 and 48 to provide a lip indicated by the numeral 50 which extends, preferably, completely around the housing 14. Referring now to the jaw 22, seen in FIG. 2, it is captivated within the hollow 52 of the housing and located therein by a vertical link member 54 extending through a hole 56 in the central portion of the jaw and through an elongate slot 58 in the top web 17 of the body portion 16 of the housing 14. With continuing reference to the jaw member 22, it is seen that it includes a socket segment 62, recessed in the front face 64 defining a surface of a radius of curvature similar to that of the hollow of the socket 20' and of the ball 14 of the hitch; and a pair of rearwardly extending side walls such as that indicated by the numeral 66 with a slot 68 for receiving the pivot pin indicated by the numeral 26. It will be seen that by reason of this structure, vertical movement of the pivot link 54 is effective to cause swinging movement of the jaw segment into and out of socket-defining relation on pivotal movement with respect to the pivot 26. The operator means 28 which includes the lever 30 is effective to raise the pivot link 54. The pivot lever 30 includes a handle portion 70, and a bifurcated body portion 72 having a pair of spaced ears 74 and 76 with lower terminal camming surfaces 78 and 80. A pivot pin 82 is provided to span the ears 74 and 76 passing through the upper end 84 of the pivot link 54. It is thus seen that the pivot lever 30 of the adjustment means 28 is adapted for swinging movement about the pivot 82 to draw the jaw segment into the socket-defining relation with an effective mechanical advantage. A wear plate 86 having a through hole for passage of the pivot link 54 is provided and dwells on the upper web 17 of the body portion 16 of the housing and the wear plate preferably includes a nose portion 90 which dwells within the recess or neck 44 and provides an upper surface 92 upon which the camming surfaces 78 and 80 of the pivot lever 30 move in effecting the operation of the jaws. In the preferred embodiment, a relatively light spring 92 is provided to urge the jaw segment into a normal open position, the spring bearing, at one end against the intermediate portion 94 of the jaw between the jaw segment and the pivot 26 and, at the other end, against a retaining ring 96 which in turn bears against the underside of the web 17 of the housing and against the underside of the neck 44. The retaining ring 96 preferably includes an upstanding standard 98 of a latch mechanism now to be described. The standard 98 passes through a pair of aligned holes 100 and 102 of the web 17 and the wear plate 86 and upwardly between the ears 74 and 76 to an upper end adjacent the horizontal plane which includes the center line of the pivot pin 82. The upper end of the standard 98 is provided with a laterally extending shoulder which is sized to yieldingly extend through an opening 103 in one of the ears, such as 74, of the operator lever 30 to hold the operator lever in the position shown in FIG. 2 and yieldable in response to a lateral pressure to release the shoulder from the edge 104 of the hole 103 so that the pivot lever may be rotated about the pivot 82 to move the jaw segments, agains the force of spring 92, out of socket-defining relation. With continued reference to FIG. 2, it is seen that the pivot link 54 is secured at its lower end to the coupler by means of a bolt nut 106 which is captivated or secured as by welding as at 108 so that it may not be removed from the screw threaded portion 110 at the lower end of the pivot link 54. Preferably, a relatively heavy shock-absorbing spring 112 is captivated between the upper face of the nut 106 and the bottom of the intermediate portion of the jaw for resiliently yielding in response to bumps and the like as the trailer is moved behind a vehicle.

The lock means 34 will now be described. It is shown in two alternative embodiments, the embodiment seen in FIGS. 1, 2 and 3, and the embodiment seen in FIGS. 4 and 5. Referring first to the embodiment seen in FIGS. 1, 2 and 3, it is seen that the pivot lever 30 is provided with a depending ring portion 114; and the body portion 16 seen in FIG. 1 is provided with an upstanding ring portion, the said ring portions 114 and 116 being carried and positioned on the coupler so as to be in adjacent coaxial relation when the jaw segment is in socket-defining relation with respect to the socket portion 20 of the housing. The rings are welded as at 118 and 120 to the pivot lever 30 and housing 16, respectively. A close-off plate or backing plate 122 is provided on either the housing web 17 or the underside of the pivot lever 30 for the purpose of limiting penetration of a barrel lock into the recess of common diameter defined by the adjacent coaxial rings. The barrel lock 124 is sized for snug receipt within the aforesaid recess and, when positioned within the recess, is adapted to lock the coupler in the clamping position seen in FIGS. 1 and 2. To maintain the barrel lock 124 within the rings, a spring biased keeper pin 126 is provided which projects radially into a lateral pocket 128 in the side wall of one of the rings, such as 116.

In operation, the key 130 shown in chain dot lines may be manipulated to withdraw the pin 126 against the spring bias and permit removal of the barrel lock 124 from the position shown in FIGS. 1 and 2. To accommodate positioning of the barrel lock in the position shown in FIG. 2, a locater recess 132 is preferably provided extending from the leading face 134 of the ring 116 depthwise to the pocket 128.

Referring to the alternative construction of FIGS. 4 and 5, it is seen that instead of welding to secure the rings to the elever and body, the rings are each provided with a pair of upstanding lugs 140 and 142 and 144 and 146 which are adapted to be upset to provide the heads shown, after passage of the lugs through recesses such 148 and 150 in the pivot lever 30' and in the body portion 16'. Also, the ring which is designated by the numeral 116' includes an integral closeoff or backing plate 122' to limit depthwise penetration of the barrel lock.

It is thus seen that there is provided by reason of the barrel lock and ring arrangement and the welded nut 106 on the threaded portion 110 of the pivot link 54, a secure fastening means for coupling a trailer, such as boat trailer, to the hitch of an automobile. This is particularly desirable because it provides an inexpensive means to avoid thefts of such trailers when the boat is being used at a remote location; it also serves the additional purpose of locking the jaw of the coupler in a hitched position so that when the trailer is standing alone with a boat on it and the automobile of the boat owner is being used in another pursuit, another automobile bearing a hitch may not be employed to steal the trailer and a boat on the trailer by dropping the coupler to the hitch. It will also be apparent that the lock device provides safety while towing a vehicle, such as a camper unit, horse trailer, or other type trailer.

While the instant invention has been shown and described herein in what is conceived to be the most practical and preferred embodiment, it is recognized that departures may be made therefrom within the scope of the invention, which is, therefore, not to be limited to the details disclosed herein, but is to be accorded the full scope of the claims so as to embrace any and all equivalent apparatus and articles.

What is claimed is:

1. For use in attaching a trailer to a vehicle which is provided with a ball type hitch unit:
   (A) A coupler comprising:
      (a) a main body portion,
      (b) a ball type socket portion in said main body portion sized for companionate engagement substantially surrounding the ball of said hitch unit, (c) a jaw including a socket segment movable between a hitched and unhitched position relative to said socket portion and adapted to capture said ball in said socket portion when in the hitched position said jaw including a lever carried on the exterior of said main body portion and pivot means to connect the lever to said jaw segment, said lever being effective to move said jaw between said positions;

said pivot lever being generally parallel to said main body portion when in the hitched position, and in generally upstanding relation with respect to said body when in the unhitched position; and (d) means to mount the coupler with the trailer;

(B) A safety lock device including, (a) a pair of ring members to be used in combination with said coupler comprising;

a first ring member fixed to said body portion of the coupler in upstanding relation beneath the level of said lever when in the hitched position, and a second ring member fixed in depending relation on said lever and positioned in close, co-axial relation to said first ring member with the openings of the rings being aligned and defining a barrel lock recess, when said coupler lever is in the hitched position, (b) a barrel lock snugly nested in said barrel lock recess in spanning relation of said ring members to lock the ring members in co-axial relation when in the hitched position; and (c) keeper means to secure the barrel lock in said recess, whereby the jaw cannot be moved to the unhitched position until the keeper means is operated so that the barrel lock can be removed from said recess.

2. The device as set forth in claim 1 wherein said keeper means includes a radially extending pocket in one of said ring members in open communication with said recess and said barrel lock includes a spring biased keeper pin movable between a first position extending from the periphery of said barrel lock to register with said pocket and a second position flush with the barrel lock surface to permit withdrawal of the barrel lock.

3. The device as set forth in claim 2 wherein a guide slot is provided in said safety lock device to guide and orient the insertion of said barrel lock and confine the path of penetration to a predetermined orientation of said keeper pin with respect to said pocket.

4. The device as set forth in claim 1 wherein the ring members of said safety lock device each include an enlarged foot portion to connect the rings to the coupler.

5. The device as set forth in claim 1 wherein said keeper means includes two spaced members to close said recess to capture said barrel lock in said recess, one of said spaced members comprising a close off plate on one of the ring members at one end of said recess.

6. The device as set forth in claim 4 wherein said foot portions comprise a plurality of lugs on each ring extending into the coupler to fix the rings in a predetermined position of orientation.

7. The device as set forth in claim 2 wherein said keeper means includes a portion on one of said ring members extending across said recess and closing one end of said recess.

References Cited

UNITED STATES PATENTS

| | | | |
|---|---|---|---|
| 2,070,884 | 2/1937 | Claus | 15—104.165 |
| 3,233,913 | 2/1966 | Brown | 280—507 |
| 3,391,555 | 7/1968 | Mamo | 70—258 |
| 3,410,580 | 11/1968 | Longenecker | 280—507 |

MARVIN A. CHAMPION, Primary Examiner

R. L. WOLFE, Assistant Examiner

U.S. Cl. X.R.

280—507